US010592277B2

(12) United States Patent
Zhang et al.

(10) Patent No.: US 10,592,277 B2
(45) Date of Patent: Mar. 17, 2020

(54) SYSTEM AND METHOD FOR DETERMINING THE SUCCESS OF A CROSS-PLATFORM APPLICATION MIGRATION

(71) Applicant: Oracle International Corporation, Redwood Shores, CA (US)

(72) Inventors: Wade (Weixuan) Zhang, Beijing (CN); Hui Shen, Beijing (CN); Fangzhi Tang, Beijing (CN); Weiguo Zhu, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 15/660,492

(22) Filed: Jul. 26, 2017

(65) Prior Publication Data

US 2018/0276079 A1    Sep. 27, 2018

Related U.S. Application Data

(63) Continuation-in-part of application No. PCT/CN2017/078914, filed on Mar. 31, 2017.
(Continued)

(51) Int. Cl.
*G06F 16/30*    (2019.01)
*G06F 9/48*    (2006.01)
(Continued)

(52) U.S. Cl.
CPC .............. *G06F 9/4856* (2013.01); *G06F 8/76* (2013.01); *G06F 9/45512* (2013.01);
(Continued)

(58) Field of Classification Search
CPC .. G06F 9/4856; G06F 9/45512; G06F 9/4843; G06F 9/485; G06F 9/526; G06F 8/76; G06F 16/2282; G06F 11/1451
See application file for complete search history.

(56) References Cited

U.S. PATENT DOCUMENTS 5,678,044 A    10/1997    Pastilha
7,895,474 B2    2/2011    Collins
(Continued)

FOREIGN PATENT DOCUMENTS

| CN | 101218565 | 7/2008 |
| CN | 101727383 | 6/2010 |
| CN | 104063320 | 9/2014 |

OTHER PUBLICATIONS

Oracle®, Oracle Tuxedo Application Runtime for Batch User Guide 12c Release 2 (Feb. 2, 2012), Apr. 2016, Copyright © 2010, 2016, 163 pages.
(Continued)

*Primary Examiner* — Tarek Chbouki
(74) *Attorney, Agent, or Firm* — Tucker Ellis LLP (57) ABSTRACT

In accordance with an embodiment, described herein is a system and method for determining the migration success of an application (e.g., a batch application) from a second computing platform (e.g., a mainframe platform) to a first computing platform (e.g., an open platform). A first database associated with the first computing platform and a second database associated with the second computing platform can include the same data baseline. A set of triggers can be created on each database to capture database modification events generated by the execution of a job associated with the application on each computing platform, and to store the database modification events in a table in each database. The database modification events from each computing platform
(Continued)

can be downloaded and compared to determine the success of the application migration.

19 Claims, 9 Drawing Sheets

Related U.S. Application Data (60) Provisional application No. 62/476,546, filed on Mar. 24, 2017.

(51) Int. Cl.
    *G06F 16/22*     (2019.01)
    *G06F 8/76*     (2018.01)
    *G06F 9/455*     (2018.01)
    *G06F 9/52*     (2006.01)
    *G06F 11/14*     (2006.01)
    *G06F 11/30*     (2006.01)

(52) U.S. Cl.
    CPC ............ *G06F 9/485* (2013.01); *G06F 9/4843* (2013.01); *G06F 9/526* (2013.01); *G06F 16/2282* (2019.01); *G06F 11/1451* (2013.01); *G06F 11/302* (2013.01); *G06F 11/3079* (2013.01); *G06F 2201/80* (2013.01); *G06F 2201/865* (2013.01)

(56) References Cited

U.S. PATENT DOCUMENTS

| | | | |
|---|---|---|---|
| 8,099,722 B2 | 1/2012 | Fairweather | |
| 8,326,867 B2 | 12/2012 | Takai | |
| 9,880,541 B2 | 1/2018 | Stone | |
| 10,135,749 B2 | 11/2018 | Soni | |
| 10,162,611 B2 | 12/2018 | Apte | |
| 2006/0235811 A1 | 10/2006 | Fairweather | |
| 2008/0276239 A1 | 11/2008 | Collins | |
| 2008/0288920 A1 | 11/2008 | Takai | |
| 2010/0088353 A1* | 4/2010 | Lee | G06F 16/10 707/809 |
| 2010/0242024 A1 | 9/2010 | Gonzales | |
| 2010/0287540 A1 | 11/2010 | Takai | |
| 2012/0041933 A1* | 2/2012 | Driesen | G06F 16/214 707/702 |
| 2012/0246651 A1 | 9/2012 | Li | |
| 2014/0019977 A1 | 1/2014 | Kakade | |
| 2014/0143263 A1* | 5/2014 | Ritter | G06F 16/215 707/756 |
| 2015/0019488 A1* | 1/2015 | Higginson | G06F 16/214 707/634 |
| 2015/0160934 A1 | 6/2015 | Beit-Aharon | |
| 2016/0179573 A1 | 6/2016 | Kneisel | |
| 2017/0192758 A1 | 7/2017 | Apte | |
| 2017/0192777 A1 | 7/2017 | Apte | |
| 2017/0337056 A1* | 11/2017 | Kim | G06F 8/76 |

OTHER PUBLICATIONS

State Intellectual Property Office of the P.R. China (ISA/CN) International Searching Authority, International Search Report and Written Opinion dated Dec. 27, 2017 for International Application No. PCT/CN2017/078914, 11 Pages.

United States Patent and Trademark Office, Office Action dated Feb. 13, 2019 for U.S. Appl. No. 15/660,484 , 13 Pages.

United States Patent and Trademark Office, Notice of Allowance and Fee(s) Due dated Sep. 5, 2019 for U.S. Appl. No. 15/660,484, 14 Pages.

\* cited by examiner

SYSTEM AND METHOD FOR DETERMINING THE SUCCESS OF A CROSS-PLATFORM APPLICATION MIGRATION

CLAIM OF PRIORITY AND CROSS-REFERENCE TO RELATED APPLICATIONS

This application is a continuation-in-part application of and claims the benefit of priority to International Patent Application No. PCT/CN2017/078914, titled "SYSTEM AND METHOD FOR DETERMINING THE SUCCESS OF A CROSS-PLATFORM APPLICATION MIGRATION", filed Mar. 31, 2017; and also claims the benefit of priority to U.S. Provisional Patent Application No. 62/476,546, titled "SYSTEM AND METHOD FOR PROVIDING A NATIVE JOB CONTROL LANGUAGE EXECUTION ENGINE IN A MAINFRAME REHOSTING PLATFORM", filed Mar. 24, 2017; and is related to U.S. patent application Ser. No. 15/660,484 titled "SYSTEM AND METHOD FOR PROVIDING A NATIVE JOB CONTROL LANGUAGE EXECUTION ENGINE IN A REHOSTING PLATFORM", filed Jul. 26, 2017; each of which above patent applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for determining the success of an application migration from a mainframe platform to an open platform.

BACKGROUND

To reduce costs and become as agile as possible, organizations today are increasingly seeking to move business-critical mainframe applications to open systems and cloud environments. After a mainframe application is migrated to to an open system, a reliable method for determining the success of the migration is needed.

SUMMARY

In accordance with an embodiment, described herein is a system and method for determining the migration success of an application (e.g., a batch application) from a second computing platform (e.g., a mainframe platform) to a first computing platform (e.g., an open platform). A first database associated with the first computing platform and a second database associated with the second computing platform can include the same data baseline. A set of triggers can be created on each database to capture database modification events generated by the execution of a job associated with the application on each computing platform, and to store the database modification events in a table in each database. The database modification events from each computing platform can be downloaded and compared to determine the success of the application migration.

DETAILED DESCRIPTION

As companies face increasing pressure to deliver more business value from their IT spending and free up funding for new business initiatives, more and more companies are migrating their mainframe applications to open systems/rehosting platforms to reduce mainframe costs and to modernize legacy applications.

As used in the document, a rehosting platform and an open platform can be used interchangeably. The Oracle™ Tuxedo Application Runtimes (ART) is an example open platform or rehosting platform.

Rehosting Platform/Open System

Figure 1:
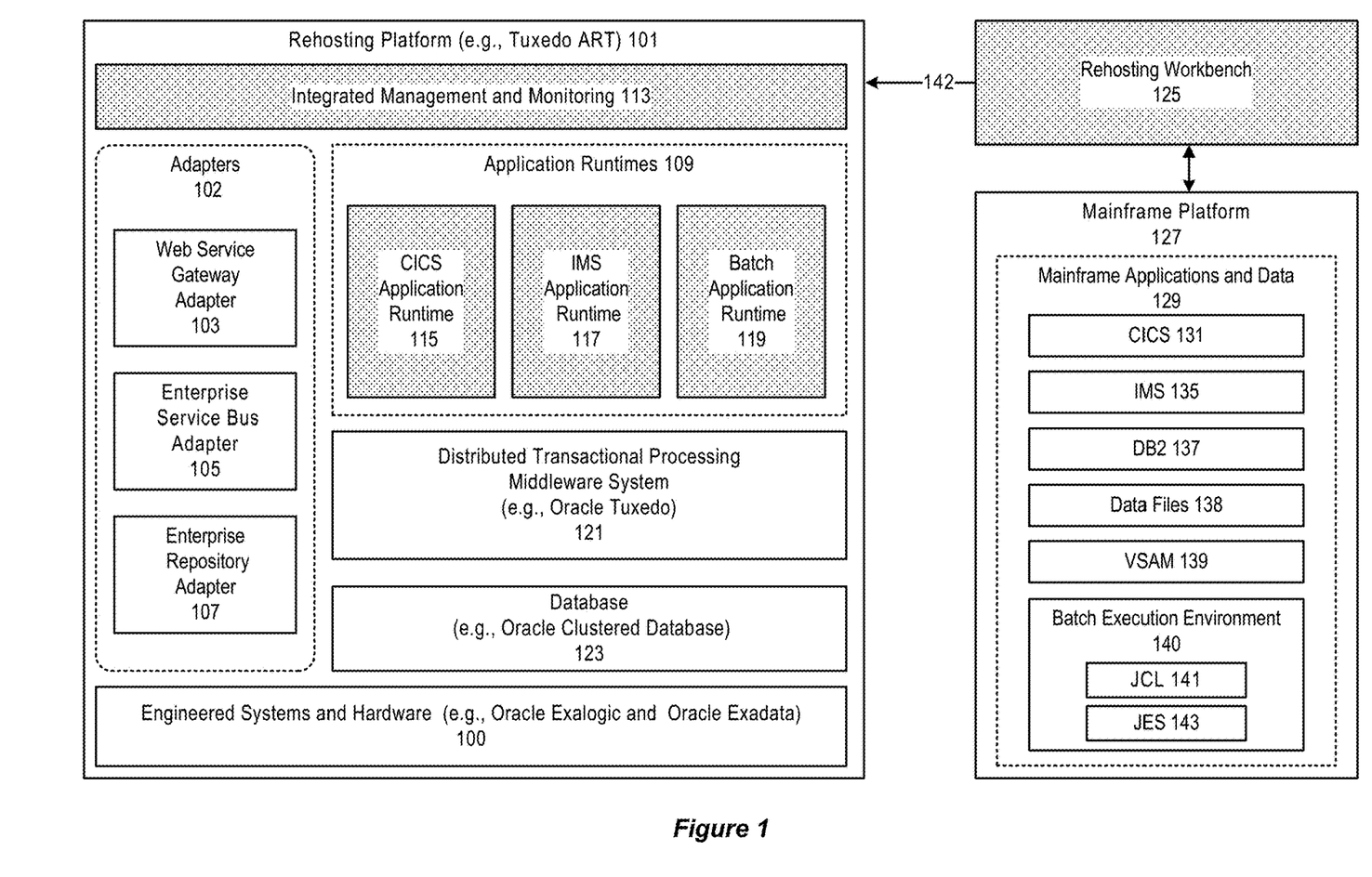
FIG. 1 illustrates an exemplary open system, in accordance with an embodiment.

FIG. 1 illustrates an exemplary open platform, in accordance with an embodiment.

As shown in FIG. 1, a rehosting platform 101 and a rehosting workbench 125 can provide an open system/platform for rehosting mainframe applications and data 129 on lower-cost platforms without losing business value or sacrificing Quality of Service (QoS).

In accordance with an embodiment, the mainframe applications and data 129 to be rehosted can currently run on a mainframe platform (mainframe platform) 127, for example, an IBM™ mainframe platform; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe platform. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe platform 127 can include a batch execution environment 140 that can support Job Control Language (JCL) 141 and a job entry subsystem (JES) 143. JES can be a major component of an operating system on the mainframe platform, can receive jobs into the mainframe platform, schedule the jobs for processing, and control their output processing.

As further shown in FIG. 1, the rehosting platform can include a software stack compatible with the mainframe platform to run mainframe applications with little to no change to minimize the risks and cost of migration; and an integrated management and monitoring component 113 for use in monitoring the rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 142 the mainframe applications 129 from the mainframe platform 127 to the rehosting platform 101.

In accordance with an embodiment, the CICS application runtime can include a set of Tuxedo servers to simulate core features of the mainframe CICS. The Tuxedo system servers can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion.

In accordance with an embodiment, the IMS application runtime can provide a set of DUI calls for use by COBOL/C applications migrated from the mainframe platform 127; a robust session environment to handle concurrent connections from a plurality of 3270 terminals; a robust execution environment to provide OLTP to process transaction codes received from the 3270 terminals via calling the migrated COBOL/C applications; and a DB plug-in on the rehosting platform.

In accordance with an embodiment, the batch application runtime 119 can include a set of Tuxedo servers to simulate mainframe JES core features.

For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe platform 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL/JCL.

The code migration tools can apply sophisticated language processing to adapt COBOL code between compiler dialects, transform JCL into a script language supported on the open system, adapt SQL calls for differences between DB2 and Oracle DB. For data migration, the data migration tools can generate target schemas, including Oracle DDL, in the rehosting platform 101, and can automate data reloading to the generated target schemas.

In accordance with an embodiment, the rehosting workbench can be used in UNIX command line mode, and an Eclipse IDE graphical environment; and can generate system configuration files for the rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Figure 2:
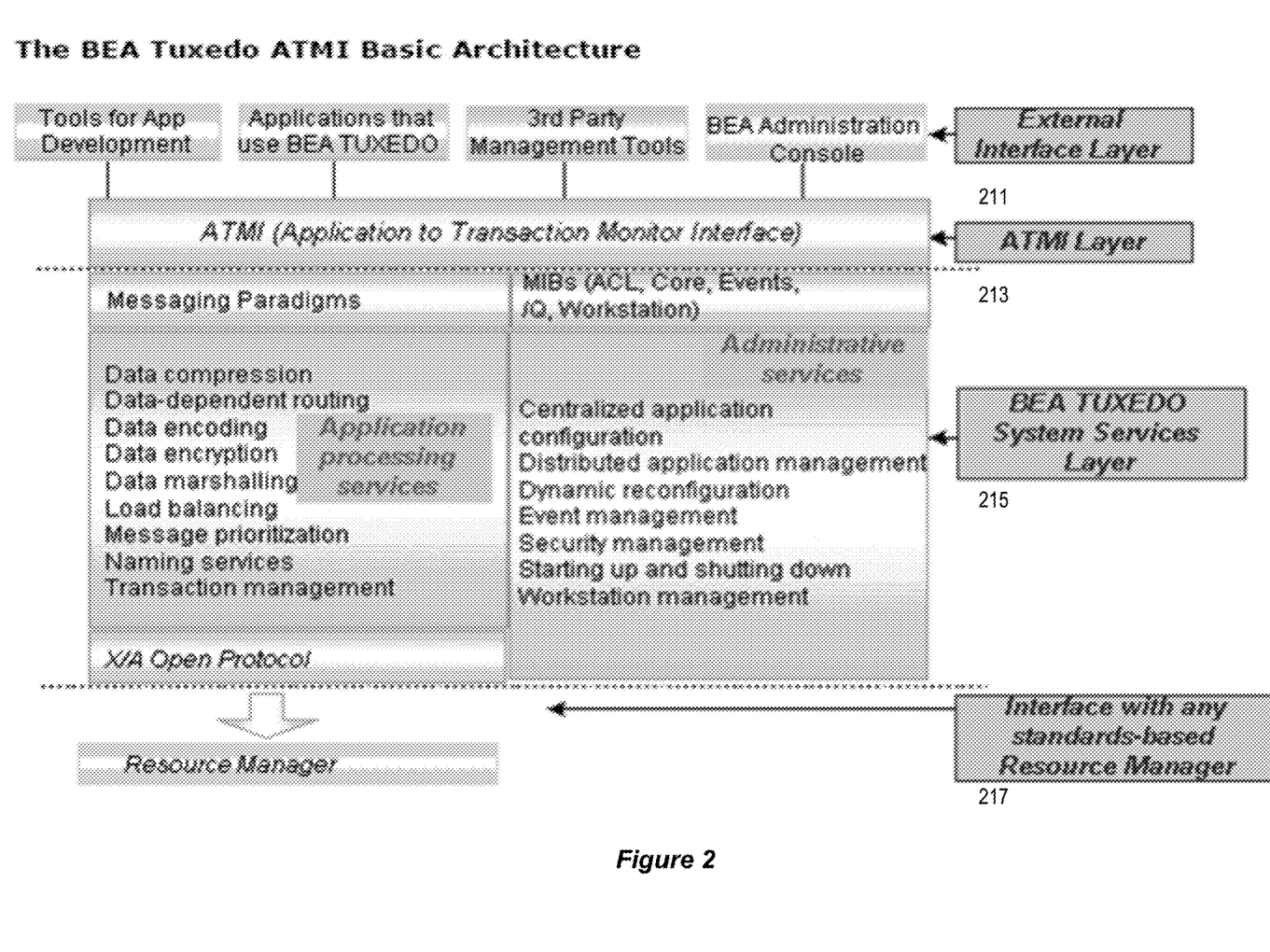
FIGS. 2-3 illustrate an example of the transactional middleware system 121 as shown in FIG. 1, in accordance with an embodiment.
Figure 3:
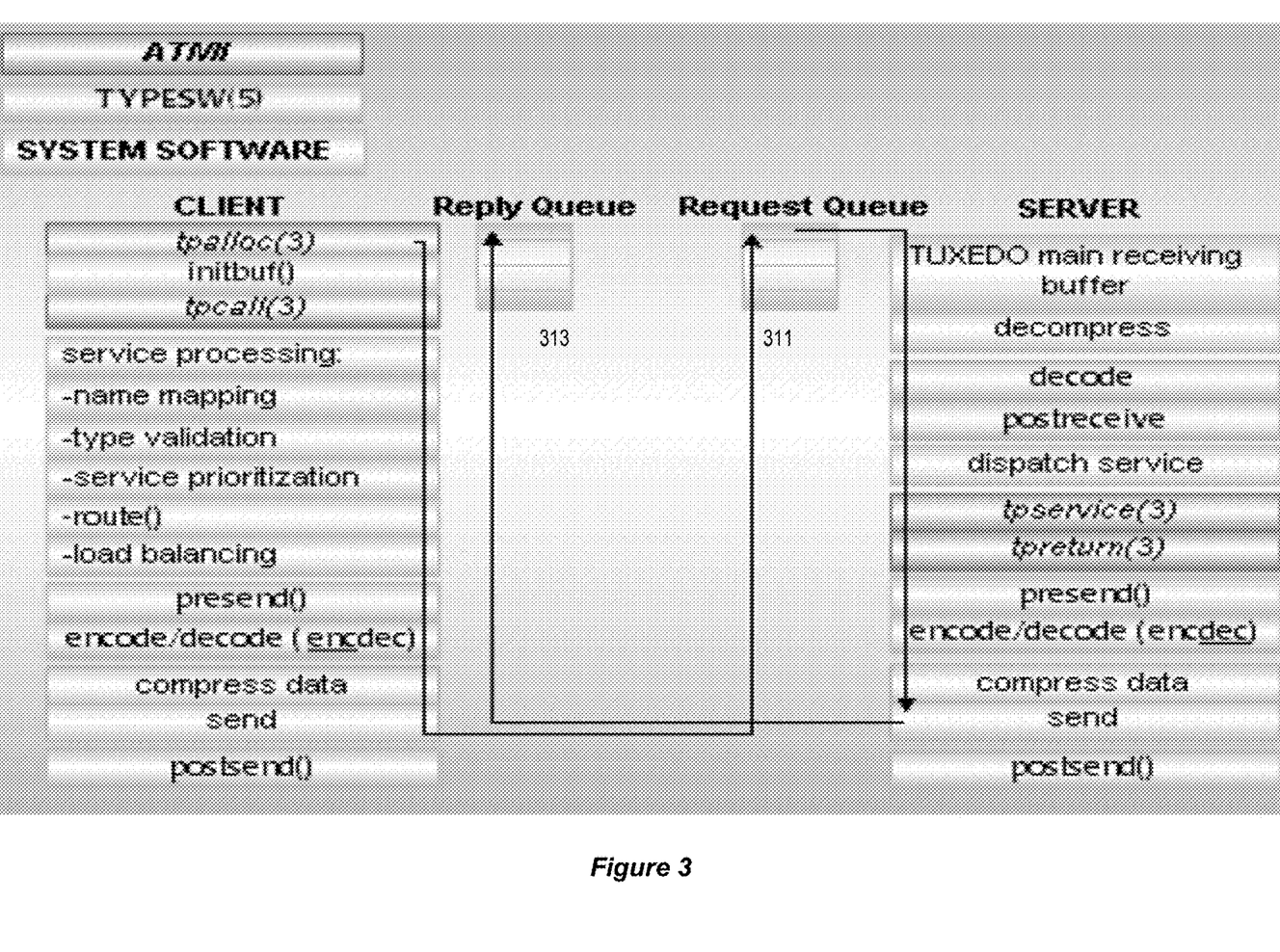

FIGS. 2-3 illustrate an example of the transactional middleware system 121 as shown in FIG. 1, in accordance with an embodiment.

In accordance with an embodiment, Tuxedo (Transactions for UNIX, Enhanced for Distributed Operation) can be an example of the transactional middleware system. Tuxedo represents a middleware product or system that can operate as an extension of an operation system (for example, UNIX). As a platform for execution and development, Tuxedo is designed for the creation and administration of e-commerce online transaction processing (OLTP) systems.

In accordance with an embodiment, the Tuxedo system shown in FIGS. 2-3 can include an Application-to-Transaction Monitor Interface (ATMI) environment for use in communications, transactions, and management of data buffers.

As shown in FIG. 2, the ATMI environment can include an external interface layer 211, an ATMI layer 213, a system services layer 215, and a resource manager layer 217. The external interface layer can provide a plurality of interfaces between users and the ATMI environment. The ATMI layer can represent an interface between applications and the ATMI environment. The system services layer can provide services and/or capabilities for developing and administering applications.

In accordance with an embodiment, the Tuxedo system can use a message-based communications system to distribute applications across various operating system platforms and databases.

As shown in FIG. 3, communication within the ATMI environment can be accomplished by transferring messages. The Tuxedo system can pass service request messages between ATMI clients and servers through operating system (OS) inter-process communications (IPC) message queues, for example, a request queue 311 and a reply queue 313. System messages and data can be passed between the OS-supported, memory-based queues of clients and servers in buffers.

In accordance with an embodiment, messages in the ATMI environment can be packaged in typed buffers, which can represent buffers that contain both message data and data identifying the types of message data being sent.

Figure 4:
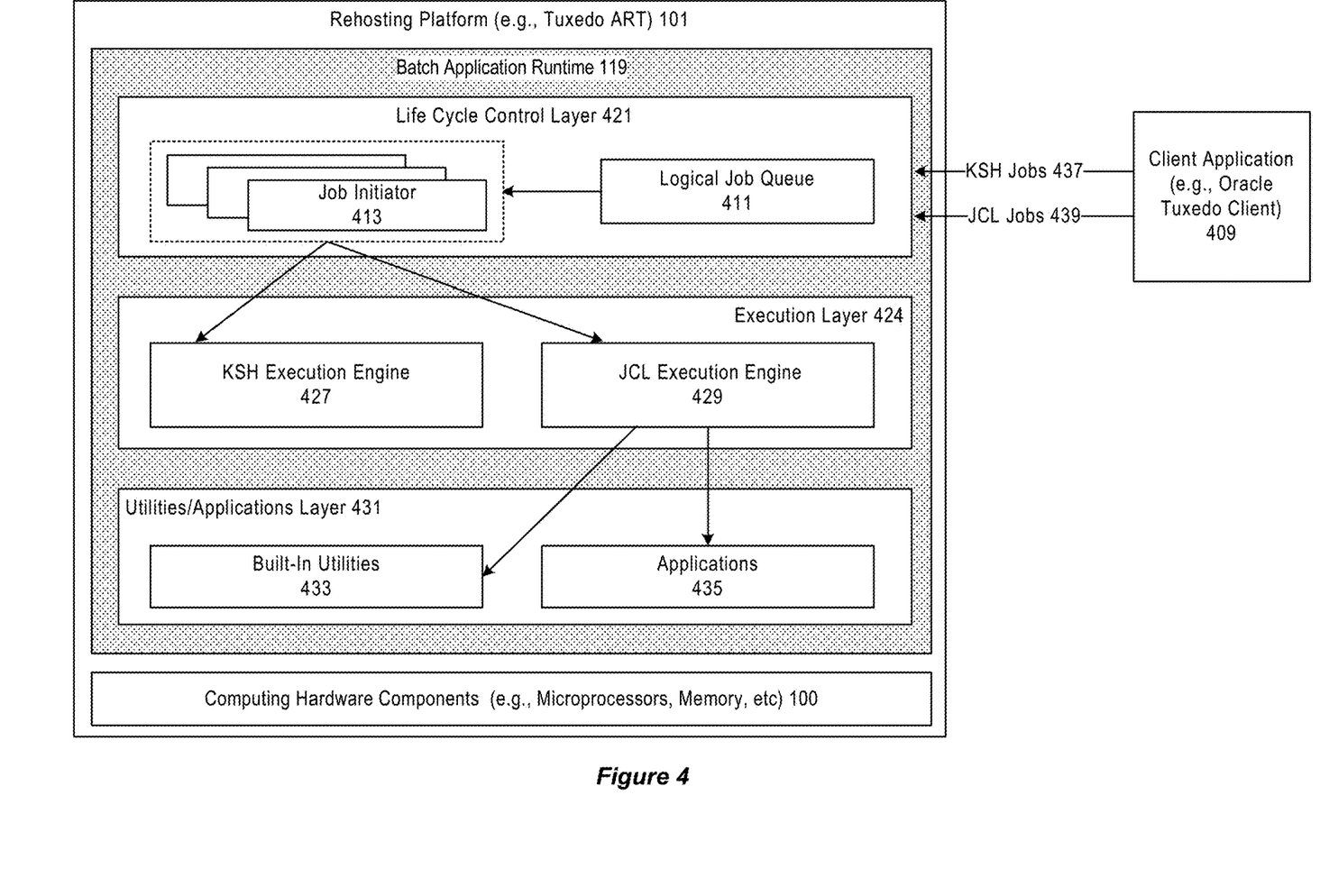
FIG. 4 illustrates a system for providing a Job Control Language (JCL) execution engine in an open platform, in accordance with embodiment.

FIG. 4 illustrates a system for providing a JCL execution engine in an open platform, in accordance with embodiment.

In accordance with an embodiment, the batch application runtime 119 can provide a combination of utilities and services that allow a mainframe batch application migrated from a mainframe platform to run on the open platform unchanged, preserving existing business logic and data.

In accordance with an embodiment, a mainframe batch application can comprise one or more JCL scripts, one or more related programs (e.g., COBOL programs), and data. When the batch application is migrated from a mainframe system to an open system, the JCL scripts can be unchanged, or can be converted into KSH scripts.

However, KSH scripts and JCL scripts are two different script languages. Converting JCL scripts into KSH scripts would render the the knowledge and skills of maintaining the original application of little value, and make it difficult to compare the converted application with the original application when the need arises to determine whether the converted application has executed successfully on the rehosting platform.

In accordance with an embodiment, the rehosting platform 101 can provide native support for JCL jobs, in addition to providing support for KSH jobs. The native support can enable the rehosting platform to run the JCL scripts without converting them.

In accordance with an embodiment, a JCL job can be defined by one or more JCL scripts, and can represent a unit of work that comprises a plurality of job steps. Each job step can be specified by a set of job control statements, and can identify one or more programs (e.g., COBOL programs/ applications/executables) to be executed, the inputs required, and location of the inputs and/or outputs.

In accordance with an embodiment, a JCL job can be submitted to the open system for execution via a client application using one or more JCL scripts.

Similarly, a KSH job can be defined by one or more KSH scripts, and can be submitted to the open system for execution via a client application using one or more KSH scripts.

As shown in FIG. 4, the batch application runtime 119 can provide a plurality of software modules/components in multiple layers to enable native support for JCL jobs, for example, a life cycle control layer 421, an execution layer 424, and a utilities/applications layer 431.

In accordance with an embodiment, the life cycle control layer can be configured to manage the life cycle of a JCL job, and to manage high availability, scalability, management and monitoring of the JCL job. The execution layer can include a Korn shell (KSH) execution engine 427 configured to execute KSH scripts converted from JCL scripts, and a JCL execution engine 429 configured to directly execute the JCL scripts without converting them.

As shown in FIG. 4, the life cycle control layer can include a job queue 411 that can receive submissions of KSH jobs 437 and JCL jobs 439 from a client application 409, and a plurality of job initiators (e.g., job initiator A 413, and job initiator B 414) distributed on a plurality of servers. The client application can be a command interface used to submit jobs, hold job, release jobs, cancel jobs, purge a jobs, display job information, or subscribe to events for job status changes. An example client application can be the Oracle Tuxedo client.

In accordance with an embodiment, the job queue can queue the KSH jobs and the JCL jobs, with each job associated with metadata specifying a job priority. The plurality of job initiators can be configured to dequeue jobs from the job queue, and dispatch each of the dequeued jobs, either to the job execution engine or the KSH execution engine, based on the type of the job, for example, whether the job is a KSH job or a JCL job. There can be multiple running instances of the JCL execution engine, and multiple running instances of the KSH execution engine.

In accordance with an embodiment, the utilities/applications layer 431 can include one or more z/OS built-in utilities 433 and one or more applications 435 configured to be invoked by the JCL execution engine. The applications can be the programs identified for execution in a JCL script or KSH script. An example application in this layer can be a COBOL program or a COBOL executable.

In accordance with an embodiment, when the JCL execution engine receives a JCL job, it can generate a statement sequence from the JCL job, and order statements in the sequence into a doubly-linked sequence. The JCL execution engine can execute JCLLIB & INCLUDE statements in the JCL job to include code referenced by the JCL job, and parse the statement sequence to construct a logical job element hierarchy. The job element hierarchy can include a plurality of steps (e.g., IF/THEN/ELSE/ENDIF, CNTL/ENDCNTL), each step containing one or more DDs, each DD containing one or more concatenated DDs. Finally, the JCL job can be executed.

Migration Success Determination

After a batch application is migrated to an open platform from a mainframe platform, a user would need to determine whether the migration is successful.

Generally, the migration success of a mainframe batch application can be determined by the execution success of a job that utilizes the programs, data and scripts associated with the mainframe batch application.

For example, the return code of the job execution can be checked to determine if an expected value has been received. A zero means that the job has executed successfully, and a non-zero value means that a warning/error occurs. This type of verification can be checked from the exit code of a job execution process, or a job execution log file.

However, a job execution may require external resources, for example, data residing on either disk files, or database tables. As such, in addition to the return code of a job, changes on external resources are also needed to be verified to determine the job has been executed successfully.

To verify data changes, a job needs to be launched on both the mainframe platform and the open platform, and database results from both platforms need to be compared to determine whether the job has performed the same data update operations on both platforms.

However, assuming the data baseline is the same for the mainframe platform and the open platform, directly comparing the results can be difficult, because of the size of the data, and the different database table definitions on the platforms.

In accordance with an embodiment, the system and method described herein can be used to determine the migration success of an application (e.g., a batch application) from a second computing platform (e.g., a mainframe platform) to a first computing platform (e.g., an open platform). A first database associated with the first computing platform and a second database associated with the second computing platform can include the same data baseline. A set of triggers can be created on each database to capture database modification events generated by the execution of a job associated with the application on each computing platform, and to store the database modification events in a table in each database. The database modification events from each computing platform can be downloaded and compared to determine the success of the application migration.

In accordance with an embodiment, the first computing platform can be a rehosting platform, and the second computing platform can be a mainframe platform. The first database can be an Oracle database, and the second database can be a DB2 database.

In accordance with an embodiment, the job can be either a Korn shell job or a Job Control Language (JCL) job.

In accordance with an embodiment, a client application can be provided to submit the job to each computing platform. The client application can include a comparison logic component configured to determine whether the database modification events from the first database and the database modification events from the second database contain the same set of database operations. If the two sets of database modification events contain the same set of database operations, the job is considered to have executed successfully, which indicates the successful migration of the application from the first computing platform to the second computing platform.

In accordance with an embodiment, before comparing the database modification events from the first database and the second database, the comparison logic component can first determine the return code of the job submitted to the first computing platform. When the return code indicates a successful execution of the job, the comparison logic component can continue to compare the database modification events from the first database and the second database.

If the return code indicates an error of the job execution, the comparison logic component does not perform a comparison between the modification events from the first database and the modification events from the second database.

In accordance with an embodiment, a return code representing a warning can be considered an indication that the job has executed successfully.

In accordance with an embodiment, the database modification events from the first database and the database modification events from the second database can be downloaded in a plain text file to the client application, where the comparison logic can format each plain text file for comparison.

In accordance with an embodiment, the client application can be configured to access both computing platforms to install database triggers on the first database and the second database. In each database, one or more database triggers can be installed on each of a plurality of tables associated with the application.

In accordance with an embodiment, the database triggers to be installed on each computing platform can be generated by a database trigger script created in the client application. When the job is launched from the client application and executed on each computing platform, the database triggers on the database for each computing platform can be triggered to generate modification events capturing all data update operations resulted from the execution of the job on that computing platform.

In accordance with an embodiment, the client application can be used to download the database modification events from each database, and invoke the comparison logic to compare the two sets of database modification events.

Figure 5:
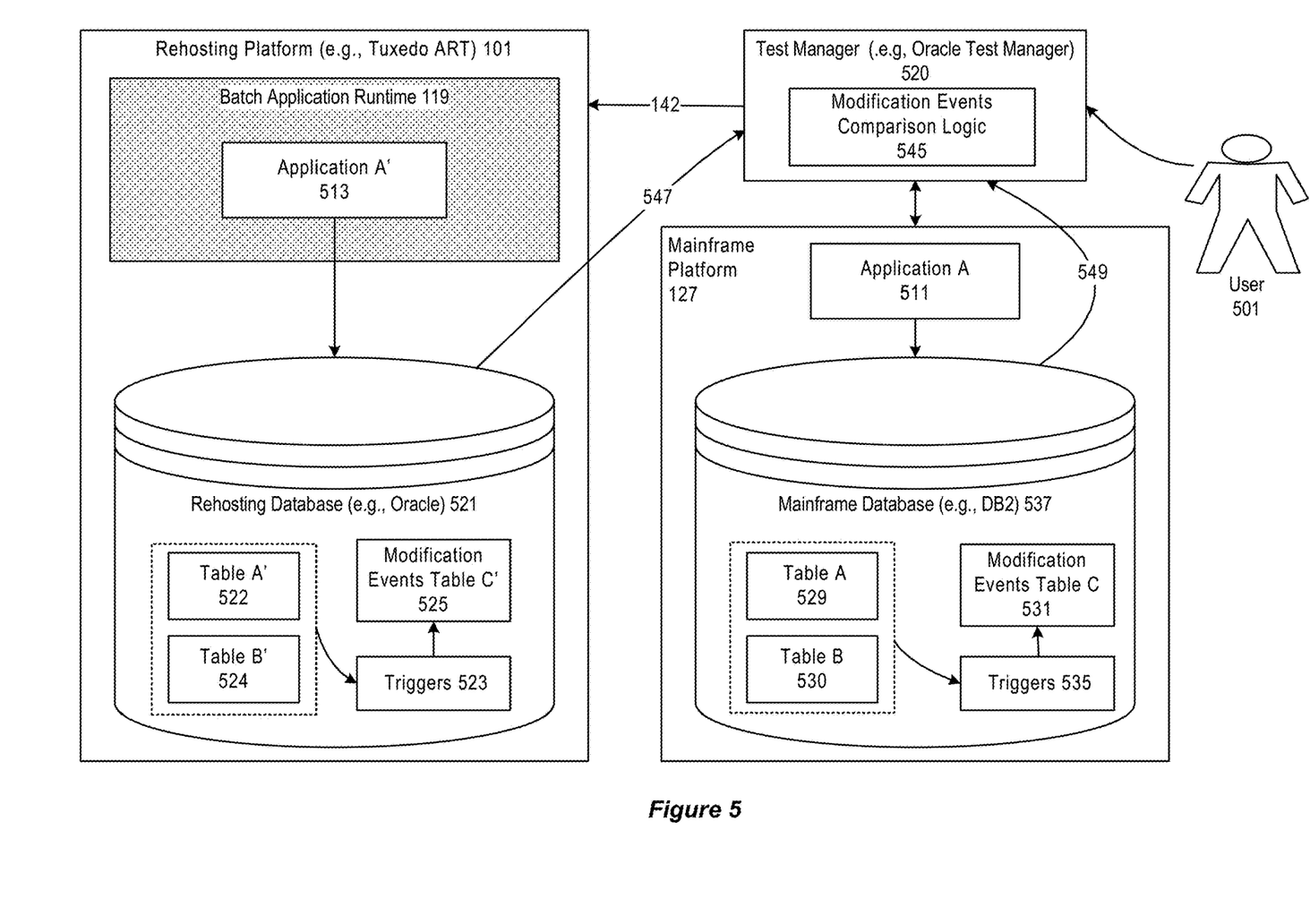
FIG. 5 illustrates a system for determining the success of an application migration from a mainframe platform to an open platform, in accordance with embodiment.

FIG. 5 illustrates a system for determining the success of an application migration from a mainframe platform to an open platform, in accordance with embodiment.

In accordance with an embodiment, mainframe application A 511 (a batch application) can be associated with a JCL script, one or more programs, and data; and can be migrated to the rehosting platform/open platform, as shown by application A' 513.

As shown by FIG. 5, mainframe application A can be associated with a plurality of tables (for example, table A 529 and Table B 530) for storing data associated with the mainframe application in a mainframe database (e.g., a DB2 database) 537.

Similarly, application A' can be associated with a plurality of tables (for example, table A' 522 and Table B' 524) for storing data associated with the mainframe application in a rehosting database (e.g., an Oracle database) 521.

In accordance with an embodiment, a rehosting workbench can be used to recreate the plurality of tables associated with mainframe application A in the rehosting database, and clone the data in the plurality of tables to the rehosting platform, so that that the two databases can have the same data baseline.

As further shown in FIG. 5, a test manager application 520, for example, Oracle test manager, can be used by a user 501 to create scripts for use in creating database triggers 523 for the plurality of tables in the rehosting database, and for creating database triggers 535 for the plurality of tables in the mainframe database. A modification events table (e.g., modification events table C 531 and modification events table C' 525) can be created respectively the mainframe database and the rehosting database, for storing database modification events captured by the database triggers in each platform.

In accordance with an embodiment, one or more batch jobs can be launched or submitted from the test manager application. As described above, the rehosting platform can provide a JCL execution engine for executing JCL jobs without the JCL jobs being converted them into KSH jobs. As such, after related programs and data are migrated from the mainframe platform to the rehosting platform, the JCL script of the batch application can be used to submit or launch batch jobs from the test manager application to both the rehosting platform and the mainframe platform.

In an example implementation, the JCL script can reside in the test manager application, and can be submitted via FTP to each platform, to launch batch jobs on each computing platform.

In accordance with an embodiment, the database triggers in each database can can listen on SQL statements issued by the batch application in each platform, capture database modification events generated by the SQL statements, and save the database modification events into a corresponding modification events table 525 or 531.

In accordance with an embodiment, when recording database modification events using the triggers on both platforms, the following rules apply: all NEW values are recorded for an insert operation; all OLD and NEW values are recorded for an UPDATE operation; and all OLD values are recorded for a DELETE operation.

In accordance with an embodiment, the test manager application can include a modification events comparison logic component 545. After execution of one or more batch jobs are completed on both platforms, database modification events data can be downloaded 547, 549 from the rehosting database and the mainframe database, and provided to the modification events comparison logic component. The modification events comparison logic component can compare the modification events data from the two platforms, to determine whether the data from each platform contains the same set of database modification events. If the data from each platform contains the same database modification events, the migration of the batch application is successful; otherwise, the migration is unsuccessful.

Figure 6:
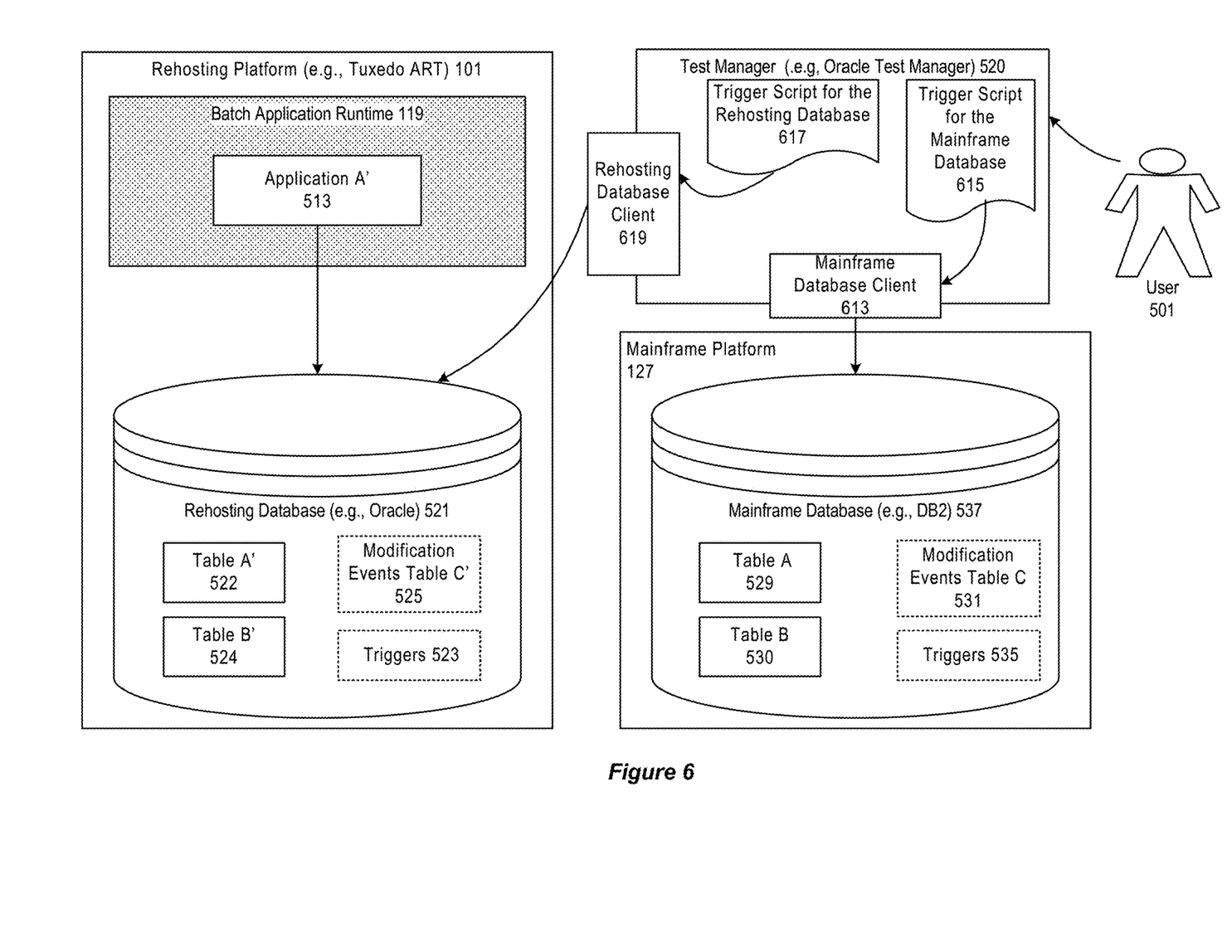
FIG. 6 further illustrates a system for determining the success of an application migration from a mainframe platform to an open platform, in accordance with embodiment.

FIG. 6 further illustrates a system for determining the success of an application migration from a mainframe platform to an open platform, in accordance with embodiment.

In accordance with an embodiment, the test manager application can run on the rehosting platform or another open system, and can be associated with a rehosting database client 619 and a mainframe database client 613.

In accordance with an embodiment, the rehosting database client can be an Oracle client configured to connect to the Oracle database, and the mainframe client can be a DB2 client configured to connect to the DB2 database.

In accordance with an embodiment, a trigger script for the mainframe database 615 and a trigger script for the rehosting database 617 can be generated, and executed via the database clients for the mainframe database and the rehosting database, to create a plurality of triggers 535 and a plurality of triggers 523 in each database.

Figure 7:
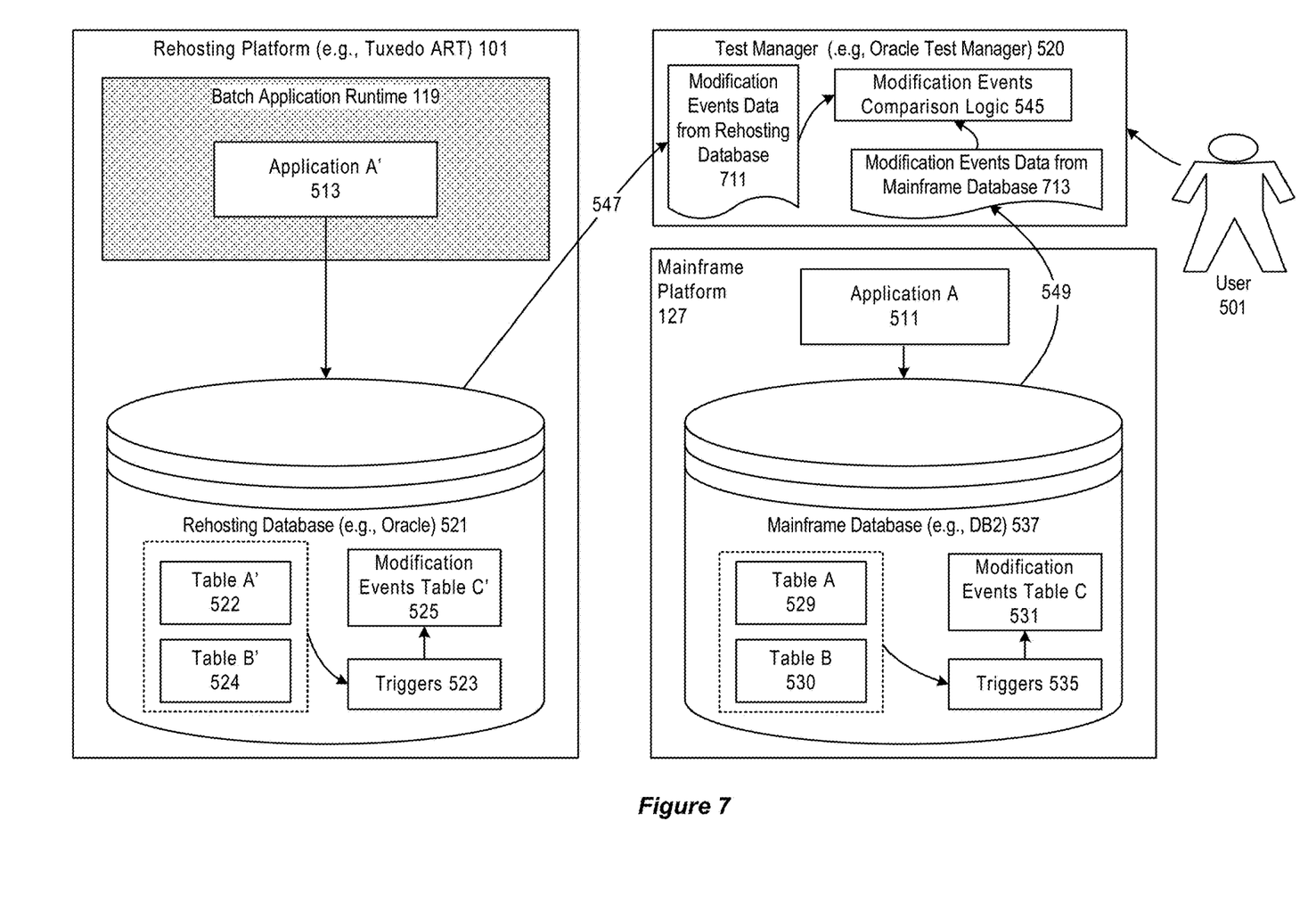
FIG. 7 further illustrates a system for determining the success of an application migration from a mainframe platform to an open platform, in accordance with embodiment.

FIG. 7 further illustrates a system for determining the success of an application migration from a mainframe platform to an open platform, in accordance with embodiment.

As shown in FIG. 7, modification events data 711, 713 from each database can be downloaded 547, 549 to the client application, and can be provided to the modification events comparison logic component.

In accordance with an embodiment, the database modification events data from each database can be contained in a plain text file. Each plain text file can include a plurality of database events, for example, INSERT, UPDATE and DELETE, from each database.

Since the database modification events are from different database products, their formats can be different. The modification events comparison logic component can include code to parse each plain text file, and format the modification events from each database, so that a meaningful comparison can be performed between the two plain text files to determine whether the same set of modification events have occurred on each computing platform.

In accordance with an embodiment, based on whether the execution of the batch job displays the same behaviors on both platforms in terms of database modifications, the test manager application can determine whether the mainframe application has executed successfully on the open/rehosting platform, and thus the migration success of the mainframe application.

Figure 8:
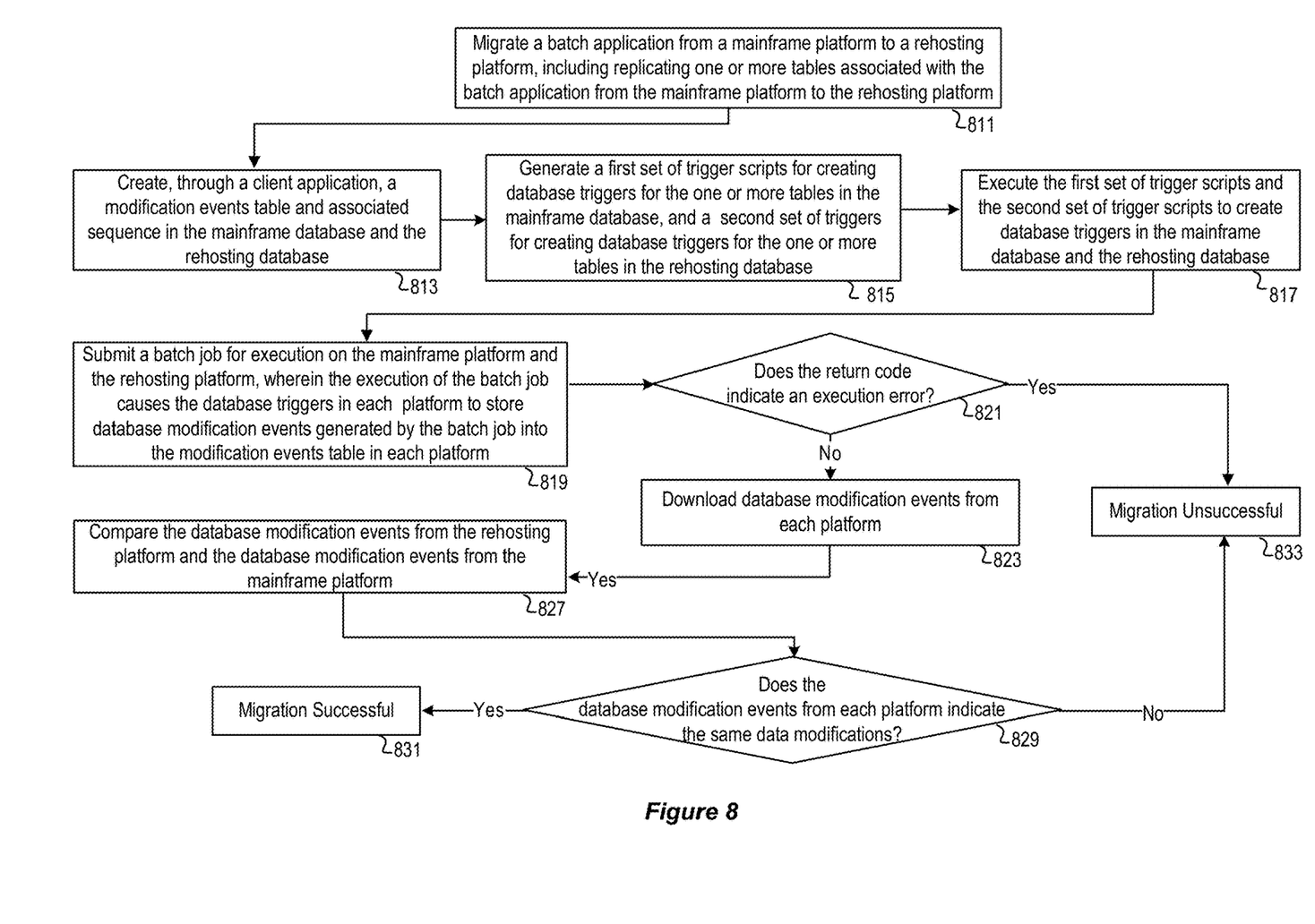
FIG. 8 illustrates a flowchart for determining the success of an application migration from a mainframe platform to an open platform, in accordance with embodiment.

FIG. 8 illustrates a flowchart for determining the success of an application migration from a mainframe platform to an open platform, in accordance with embodiment.

As shown in FIG. 8, at step 811, a batch application is migrated from a mainframe platform to a rehosting platform/open platform, and one or more tables associated with the batch application are replicated from a mainframe database of the mainframe platform, to a rehosting database of the rehosting platform.

In accordance with an embodiment, at this step, resources required by the batch application can be downloaded to a workbench from the mainframe platform. The resources can include JCL job scripts, SYSIN, PROC scripts, COBOL programs, COPYBOOK script, and DB2 DDL scripts. The downloaded resources can be merged and categorized, and can be placed into a workbench project.

Further, at this step, SQL scripts can be used to create corresponding tables on the rehosting (e.g., Oracle) database; and reload scripts can be used to reload the mainframe database (e.g., DB2 database) content into the rehosting database, so that the rehosting database can contain a full copy of the mainframe database data.

At step 813, a modification events table and associated sequence are created in the mainframe database and the rehosting database using a client application.

At step 815, database trigger scripts are generated for the mainframe database and the rehosting database. A first set of trigger scripts are generated for creating database triggers for the one or more tables in the mainframe database, and a second set of triggers are generated for creating database triggers for the one or more tables in the rehosting database.

At step 817, the trigger scripts are executed to create database triggers in the mainframe database and the rehosting database.

At step 819, a batch job is submitted to the mainframe platform and the rehosting platform for execution, wherein the execution of the batch job causes the database triggers in each platform to store database modification events generated by the batch job into the modification events table in each platform.

At step 821, the return code of the batch job from the rehosting/open platform is checked to determine whether the return code indicates an error during the execution of the batch job in the rehosting platform. If the job execution returns an error code, the migration would be determined to be unsuccessful as shown at step 833.

However, if the job execution returns a warning or success code, the database modification events data is downloaded from each platform as shown at step 823.

At step 827, the database modification events data from the rehosting platform and the database events data from the mainframe platform are compared.

At step 829, the client application is used to determine whether the batch job execution generates the same set of database operations. If the same set of database operations are generated on each platform, the migration of the batch job is determined to be successful, at shown at step 831; otherwise, the job migration is determined to be a failure.

In accordance with an embodiment, when storing a data update to a BLOG data for a BLOB column in a modification events table, the BLOG data can be converted to readable hex character using hex( ) function provided by DB2. In accordance with an embodiment, the database triggers can capture the first 16352 bytes of the BLOB data update.

In accordance with an embodiment, the modification events tables on both platform can be cleaned for the next job execution, including dropping the triggers created previously, and cleaning the modification events data and associated sequence.

Figure 9:
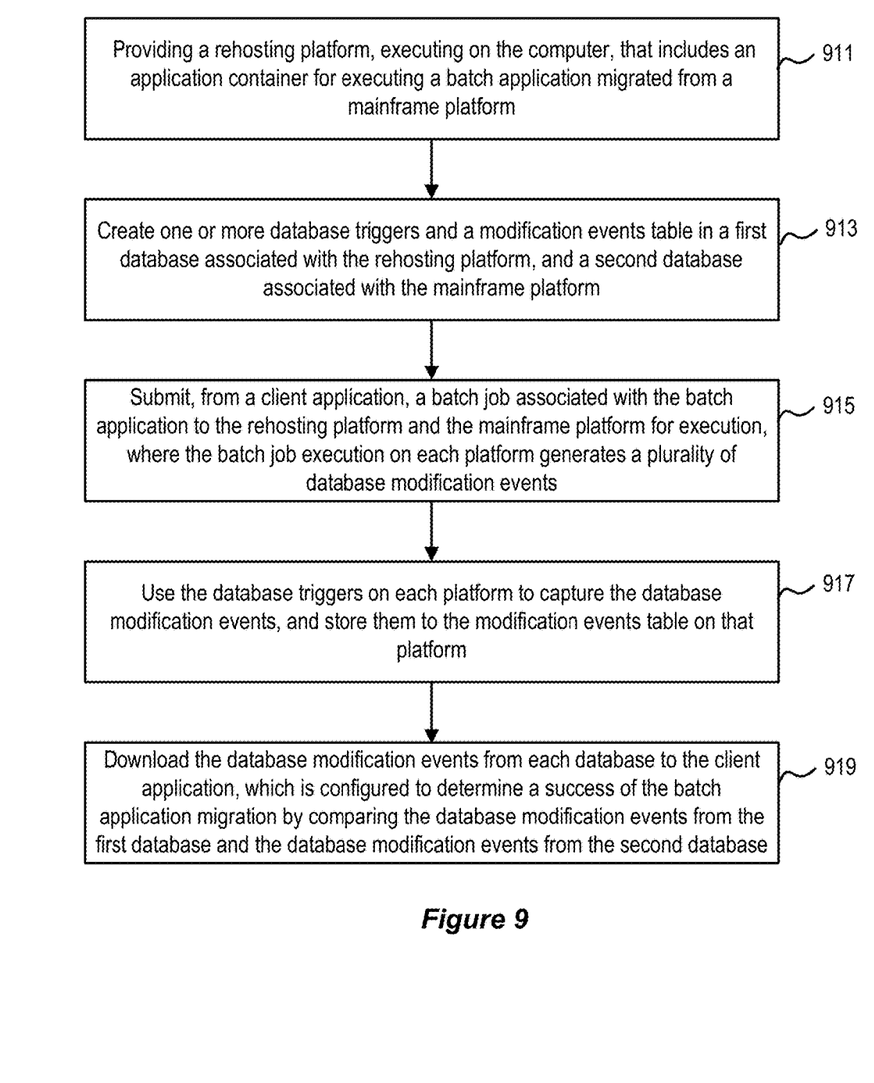
FIG. 9 illustrates a method for determining the success of an application migration from a mainframe platform to an open platform, in accordance with embodiment.

FIG. 9 illustrates a method for determining the success of an application migration from a mainframe platform to an open platform, in accordance with embodiment.

As shown by FIG. 9, at step 911, a rehosting platform is provided on a computer including one or more microprocessors, wherein the rehosting platform includes an application container for executing a batch application migrated from a mainframe platform.

At step 913, one or more database triggers and a modification events table are created in a first database associated with the rehosting platform, and a second database associated with the mainframe platform.

At step 915, a batch job associated with the batch application is submitted from a client application to the rehosting platform and the mainframe platform for execution, where the batch job execution on each platform generates a plurality of database modification events.

At step 917, the database triggers on each platform are used to capture the database modification events, and store them to the modification events table on that platform.

At step 919, the database modification events from each database are downloaded to the client application, which is configured to determine a success of the batch application migration by comparing the database modification events from the first database and the database modification events from the second database.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for determining the migration success of an application, comprising:
 a microprocessor;
 a first computing platform executing on the microprocessor, wherein the first computing platform includes an application container for executing an application migrated from a second computing platform;
 a first database associated with the first computing platform, and a second database associated with the second computing platform, wherein each database includes one or more database triggers and a modification events table;
 a job associated with the migrated application, wherein the job is received at each computing platform for execution, wherein the job execution on each computing platform generates a plurality of database modification events;
 wherein the database triggers on each computing platform capture the database modification events and store them to the modification events table on that computing platform; and
 a client application which includes a comparison logic configured to determine the success of the application migration, wherein the client application is configured to perform steps comprising,
  determining a return code of the job execution on the first computing platform,
   generating an indicator indicating that the application migration is a failure if the return code does not indicate a successful execution of the job,
   comparing the database modification events from the first database and the database modification events from the second database if the return code indicates a successful execution of the job,
   generating an indicator indicating that the application migration is a failure if, based on the comparing, the database modification events from the first database and the database modification events from the second database do not contain the same set database operations, and
   generating an indicator indicating that the application migration is successful if, based on the comparing, the database modification events from the first database and the database modification events from the second database contain the same set database operations.

2. The system of claim 1, wherein the first computing platform is a rehosting platform, and the second computing platform is a mainframe platform.

3. The system of claim 1, wherein the first database is an Oracle database, and the second database is a DB2 database.

4. The system of claim 1, wherein the job is a Korn shell job or a Job Control Language (JCL) job.

5. The system of claim 1, wherein the database modification events from the first database and the database modification events from the second database are downloaded in a plain text file to the client application; and wherein the comparison logic formats each plain text file for comparison.

6. The system of claim 1, wherein the database triggers on each computing platform are generated by a database trigger script created in the client application.

7. The system of claim 1, wherein the client application is configured with an Oracle client and a DB2 client to communicate with the first database and the second database.

8. The system of claim 1, wherein the comparison logic is further configured to check a return code of the job execution.

9. The system of claim 1, wherein the first computing platform is hosted in a cloud environment.

10. A method for determining the migration success of a batch application, comprising:
    providing a first computing platform, executing on a microprocessor, wherein the first computing platform includes an application container for executing an application migrated from a second computing platform;
    creating one or more database triggers and a modification events table in a first database associated with the first computing platform, and a second database associated with the second computing platform;
    receiving a job associated with the application at each computing platform for execution, wherein the job execution on each computing platform generates a plurality of database modification events;
    using the database triggers on each computing platform to capture the database modification events, and store them to the modification events table on that computing platform; and
    providing a client application comprising comparison logic; and
    determining a return code of the job execution on the first computing platform,
        generating an indicator indicating that the application migration is a failure if the return code does not indicate a successful execution of the job,
        comparing the database modification events from the first database and the database modification events from the second database if the return code indicates a successful execution of the job,
            generating an indicator indicating that the application migration is a failure if, based on the comparing, the database modification events from the first database and the database modification events from the second database do not contain the same set database operations, and
            generating an indicator indicating that the application migration is successful if, based on the comparing, the database modification events from the first database and the database modification events from the second database contain the same set database operations.

11. The method of claim 10, wherein the first database is an Oracle database, and the second database is a DB2 database.

12. The method of claim 10, wherein the job is a Korn shell job or a Job Control Language (JCL) job.

13. The method of claim 10, wherein the first computing platform is a rehosting platform, and the second computing platform is a mainframe platform.

14. The method of claim 10, wherein the database modification events from the first database and the database modification events from the second database are downloaded in a plain text file to the client application; and wherein the comparison logic formats each plain text file for comparison.

15. The method of claim 10, wherein the database triggers on each computing platform are generated by a database trigger script created in the client application.

16. The method of claim 10, wherein the client application is configured with an Oracle client and a DB2 client to communicate with the first database and the second database.

17. The method of claim 10, further comprising checking a return code of the job execution.

18. The method of claim 10, wherein the first computing platform is hosted in a cloud environment.

19. A non-transitory computer-readable storage medium storing a set of instructions for determining migration success of a batch application, said instructions, when executed by one or more processors, causing the one or more processors to perform steps comprising:
    providing a first computing platform, executing on a microprocessor, wherein the first computing platform includes an application container for executing an application migrated from a second computing platform;
    creating one or more database triggers and a modification events table in a first database associated with the first computing platform, and a second database associated with the second computing platform;
    receiving a job associated with the application at each computing platform for execution, wherein the job execution on each computing platform generates a plurality of database modification events;
    using the database triggers on each computing platform to capture the database modification events, and store them to the modification events table on that computing platform; and
    providing a client application comprising comparison logic; and
    determining a return code of the job execution on the first computing platform,
        generating an indicator indicating that the application migration is a failure if the return code does not indicate a successful execution of the job,
        comparing the database modification events from the first database and the database modification events from the second database if the return code indicates a successful execution of the job,
            generating an indicator indicating that the application migration is a failure if, based on the comparing, the database modification events from the first database and the database modification events from the second database do not contain the same set database operations, and
            generating an indicator indicating that the application migration is successful if, based on the comparing, the database modification events from the first database and the database modification events from the second database contain the same set database operations.

* * * * *